S. W. & W. H. FARNHAM.
DISTRIBUTER FOR PULVERIZED SUBSTANCES.
APPLICATION FILED JULY 22, 1908.
917,757.
Patented Apr. 13, 1909.
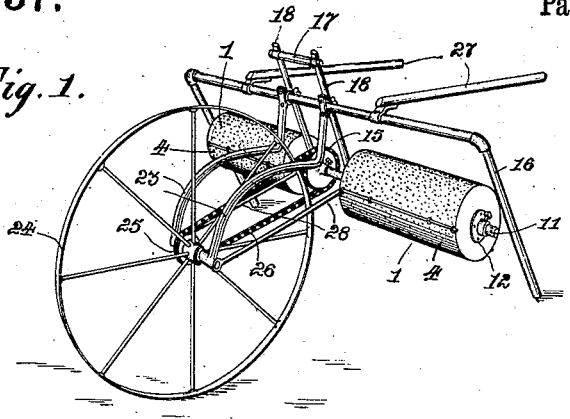
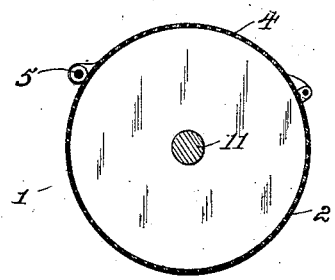
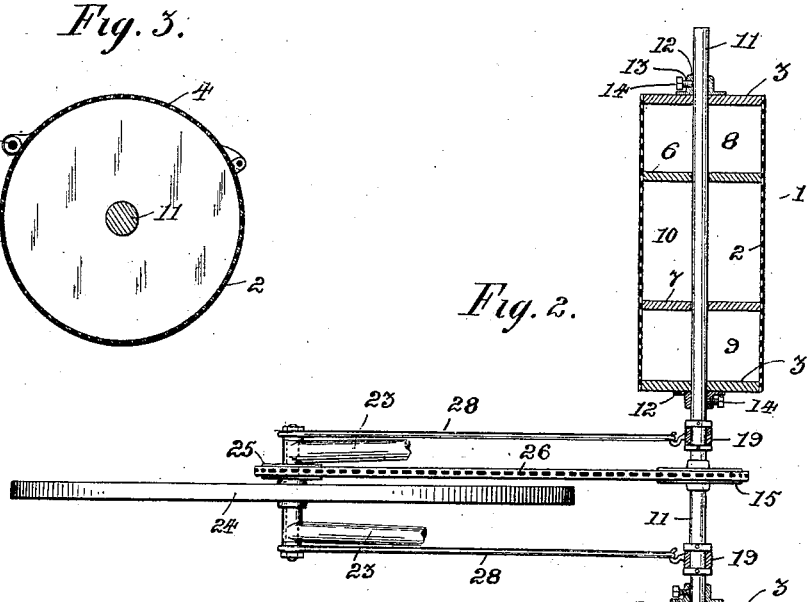
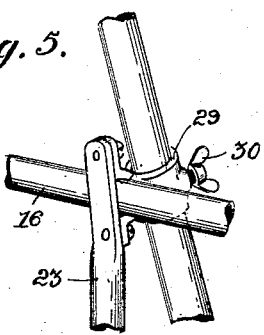
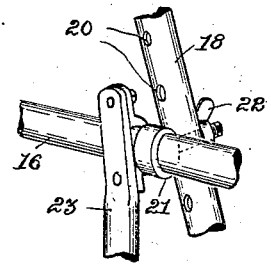
Witnesses.
H. Davis
G. H. Tresidder
Inventors.
S. W. Farnham &
W. H. Farnham
By C. J. Fetherstonhaugh
Atty.

UNITED STATES PATENT OFFICE.

SIMKINS WALTON FARNHAM AND WILLIAM HUDSON FARNHAM, OF ST. STEPHEN, NEW BRUNSWICK, CANADA.

DISTRIBUTER FOR PULVERIZED SUBSTANCES.

No. 917,757.      Specification of Letters Patent.      Patented April 13, 1909.

Application filed July 22, 1908. Serial No. 444,870.

*To all whom it may concern:*

Be it known that we, SIMKINS WALTON FARNHAM and WILLIAM HUDSON FARNHAM, residents of the town of St. Stephen, in the Province of New Brunswick, in the Dominion of Canada, and subjects of the King of Great Britain, have invented certain new and useful Improvements in Distributers for Pulverized Substances; and we do hereby declare that the following is a full, clear, and exact description of the same.

The invention relates to improvements in distributers for pulverized substances, as described in the present specification and illustrated in the accompanying drawings that form part of the same.

The invention consists essentially in the novel arrangement and construction of parts whereby a pulverized substance is evenly spread on the plants or ground by adjustable rotating members.

The objects of the invention are to spread, in an effective manner, a dry insecticide powder, to economize in the use of said powder and generally to provide a machine easy to operate and capable of spreading either a destructive agent or fertilizer.

In the drawings, Figure 1 is a perspective view of the machine complete. Fig. 2 is an enlarged sectional plan view of the machine. Fig. 3 is an enlarged cross sectional view through the cylinder. Fig. 4 is an enlarged perspective detail of the adjustable means for joining the cylinder supporting frame and the main frame. Fig. 5 is an enlarged perspective detail of another means for joining said frames.

Like numerals of reference indicate corresponding parts in each figure.

Referring to the drawings, 1 are the cylinders formed of the perforated casings 2 and the closed ends 3, the latter having central holes therethrough.

4 are hinged lids forming part of the cylinder casings 2, the said lids 4 are fastened in any suitable manner, the fastening here shown being by the rod 5 running through suitable eyes secured to the casings proper and the said lid portions of the casings.

6 and 7 are partitions arranged within the cylinders 1 and dividing said cylinders into the end compartments 8 and 9 and the middle compartments 10 so that any one or more of the compartments may be used as required.

11 is a shaft extending through the closed ends 3.

12 are boxings rigidly secured to the ends 3 and through which the shaft 11 extends, said boxings having the threaded orifices 13 into which are inserted the set screws 14, consequently the said casings may be rigidly secured to said shaft by said set screws in any desired position on said shaft, in other words, the cylinders 1 are adjustable on the shaft 11.

15 is a sprocket wheel fixedly mounted on the shaft 11 between the cylinders 1.

16 is a frame preferably of pipe formation and made in inverted U shape.

17 is a rectangular frame having the vertical pieces 18, said vertical pieces forming the bearings 19 at the lower ends of the shaft 11 and having a plurality of holes 20 extending laterally therethrough and arranged in a vertical row in each of said pieces.

21 are eye bolts through which the cross bar of the U-shaped frame 16 extends, the threaded shanks of said bolts projecting through the holes in the vertical pieces 18 and rigidly secured by the butterfly nuts 22, thus it will be seen that the cylinders 1 may be supported at any suitable height from the cross bar of the U-shaped frame 16 according to the length of the frame 17.

23 is a fork suitably secured to the cross bar of the U-shaped frame and supporting the bearing of the wheel 24.

25 is a sprocket wheel fixedly mounted on the shaft rotated by the turning of the wheel 24, said sprocket 25 being connected with the sprocket 15 by the chain 26, consequently insuring the operation of the shaft 11 on the rolling of the wheel 24.

27 are handles rigidly secured to the cross bar of the frame 16 and extending rearwardly therefrom.

28 are bars extending from the outer end of the fork 23 and hooked to the lower end of the rectangular frame 17 for steadying the structure.

The invention is here shown as an implement operated as regards locomotion in a very much similar way to a wheel-barrow, but it must be understood that it may be moved around in many different ways, and in some cases by horse power, when shafts or other gear will be added to the construction, so that the horse or other animal may be attached thereto.

In the operation of the invention, the machine as shown is taken by the handles 27 and the legs of the U-shaped frame lifted from the ground, the machine is then pushed or pulled between the rows of plants to be sprinkled with powder and as the cylinders turn from sprocket and chain connection with the wheel shaft, the powder is distributed over the plants through the perforations in the cylinder casings.

The compartments of the cylinders are filled, according to the needs of the conditions surrounding the use of the implement. For instance, if only one row of plants are to be sprinkled with the powder, then probably only one compartment will be charged, but if two or more, or several, or very wide rows, then several or all the compartments may be used.

The height of the plants, of course, determines the elevation at which the cylinders will be placed on the frame 16, and it need not be explained at length the adjusting of said rectangular frame in relation to said frame 16, for it is obvious that the nuts are removed and the bolts placed in different holes according to the position required.

In Fig. 5, a different form of adjustable fastening is shown in which a collar 29 from the main frame encircles the vertical pieces 18 of the rectangular frame 17 and the set screws 30 are inserted through correspondingly threaded orifices in said collars and about the frame 17 and said vertical pieces 18.

What we claim as our invention is:

1. In distributers for pulverized substances, the combination with the frame and a running gear, of a plurality of cylindrical perforated casings, each having a plurality of compartments therein arranged, a rectangular frame adjustably secured to the aforesaid frame, bearings arranged in the lower end of said rectangular frame, a shaft carrying said perforated casings and journaled in said bearings, and means operatively connecting said running gear with said shaft.

2. In a device of the class described, an inverted U-shaped frame, a fork extending from said frame, a wheel journaled in said fork, vertical pieces adjustably joined to the cross bar of the aforesaid frame and having bearings at the lower end thereof, a shaft journaled in said bearings, a plurality of cylindrical casings mounted on said shaft and having perforations therethrough, each of said casings being divided into a plurality of compartments, means for adjusting said casings on said shaft, a chain and sprocket mechanism operatively connecting said shaft and the running gear and suitable handles secured to said U-shaped frame.

Signed at St. Stephen New Brunswick this 18th day of July A. D. 1908.

SIMKINS WALTON FARNHAM.
WILLIAM HUDSON FARNHAM.

Witnesses:
ETHEL M HANLEY,
GEORGE J. CLARKE.